E. L. WIEGAND.
EMPLACING PROCESS AND APPARATUS.
APPLICATION FILED FEB. 11, 1918.

1,312,657.

Patented Aug. 12, 1919.
5 SHEETS—SHEET 1.

Fig-1

Inventor
Edwin L. Wiegand
By Hull, Smith, Brock & West
Attys

E. L. WIEGAND.
EMPLACING PROCESS AND APPARATUS.
APPLICATION FILED FEB. 11, 1918.

1,312,657.

Patented Aug. 12, 1919.
5 SHEETS—SHEET 2.

E. L. WIEGAND.
EMPLACING PROCESS AND APPARATUS.
APPLICATION FILED FEB. 11, 1918.

1,312,657.

Patented Aug. 12, 1919.
5 SHEETS—SHEET 4.

Inventor
Edwin L. Wiegand
By Hull, Smith, Brockett
Attys

E. L. WIEGAND.
EMPLACING PROCESS AND APPARATUS.
APPLICATION FILED FEB. 11, 1918.

1,312,657.

Patented Aug. 12, 1919.
5 SHEETS—SHEET 5.

UNITED STATES PATENT OFFICE.

EDWIN L. WIEGAND, OF YOUNGSTOWN, OHIO.

EMPLACING PROCESS AND APPARATUS.

1,312,657.   Specification of Letters Patent.   Patented Aug. 12, 1919.

Application filed February 11, 1918. Serial No. 216,566.

*To all whom it may concern:*

Be it known that I, EDWIN L. WIEGAND, a citizen of the United States, residing at Youngstown, in the county of Mahoning and State of Ohio, have invented a certain new and useful Improvement in Emplacing Processes and Apparatus, of which the following is a full, clear, and exact description, reference being had to the accompanying drawings.

This invention relates to apparatus for emplacing elements in bodies of supporting material; and has to do also with the process involved.

The invention is peculiarly adapted (but not necessarily limited) to the production of electrical heating devices, and is herein illustrated in such connection.

While the main object of my present invention is to improve the apparatus disclosed in Letters Patent No. 1,133,347, issued to me on March 30, 1915, and to render automatic certain phases of its operation, the present invention contemplates a broader field of use than that expressed by the patent above referred to. It may be said therefore to have as its general objects the provision of apparatus whereon an element may be quickly and conveniently given a definite form and by means of which it may be readily emplaced or embedded in a supporting body of impressionable or plastic material, the apparatus operating with ease and precision enabling products of a high grade to be manufactured rapidly and economically.

The invention further comprehends a process of emplacing an element in a body of impressionable or plastic supporting material in such manner as to cause the element to be effectually imprisoned therein and securely held against accidental displacement, as might otherwise occur by reason of the element's tending to resume its former shape if made, as usual, of resilient material.

The foregoing objects, and others which will become apparent as this description proceeds, are attained in the exemplification of my invention illustrated in the drawings accompanying and forming a part hereof; and while I shall proceed to describe the present embodiment in detail, I wish to be understood as not limiting myself to the structural details thereof further than is required by the terms of the claims annexed hereto.

In the drawings Fig. 4 is a central vertical section through the head and the adjacent portion of the supporting arm, the same being taken on line 4—4 of Fig. 2; Fig. 5 is a section at right angles to Fig. 4 and shows the head in inverted position and indicating the condition of the stripper mechanism subsequent to the emplacement of the element in the body of supporting material; Fig. 6 is a perspective view of a cam and Fig. 7 a similar view of a cam engaging stud, which combine to constitute a latch for holding the stripper mechanism in inoperative position.

In the present embodiment, the bed 1 of the apparatus is incorporated in a table structure designated generally by the reference numeral 2. Ears 3, spaced laterally from each other, rise from one end of the bed and carry opposed pivot points 4, either or both of which may be adjustable within its or their supporting ear or ears 3.

One end of an arm 5 is supported by and between the pivot points 4, and its opposite end is forked in the nature of a yoke, to receive between the opposed branches 6 and 7 thereof what I shall refer to generally as the head 10. This may also be regarded in a broad sense, as the carrier for the element to be received.

The head 10 is made up of a number of parts including a supporting ring 11 (see Figs. 4 and 5), and is sustained for oscillatory movement upon a horizontal axis by a stud 12 that is journaled within the branch 6, and by the inner end 13 of a screw 14 that is threaded through the other branch 7, the screw 14 extending beyond the outer face of the branch and having applied to it a handle 15. Washers 16 are shown as interposed between each branch and the adjacent face of the supporting ring.

The inner end of a spiral spring 20 is fastened to the exposed portion of the stud 12, and the opposite end of the spring is anchored to a pin 21 that projects from the side of the branch 6, rearwardly of the spring. The extreme outer end of the stud 12 is provided with a wrench receiving portion 22, to facilitate screwing the stud into the supporting ring.

Figure 3:
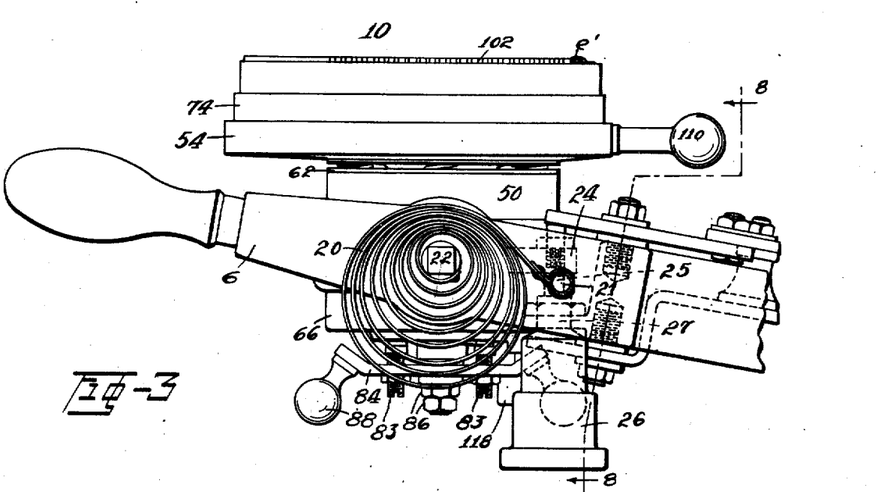
Fig. 3 is an enlarged elevation of the reverse side of the head from that shown in Fig. 1.

As will be seen presently, in the operation of the apparatus it is necesary to oscillate the supporting ring, first in one direction and then the other, through substantially 180 degrees, and in this connection it may be explained that the stud 12 is fixed with respect to the ring. The spring 20, being under tension and disposed as shown in Fig. 3, tends to rotate the supporting ring in a right hand direction, and the movement of the ring in this direction is arrested by the engagement of its stop 24 with a suitable cushion device, in the present instance the same constituting the plunger 25 of a dash-pot 26 that is supported within a web 27, disposed within the fork of the arm 5 adjacent to branch 6. The movement of the suporting ring in the opposite direction is arrested by the engagement of its stop 30 with the lower end of a stud 31 that is adjustable within a web 32, located adjacent the branch 7.

Figure 9:
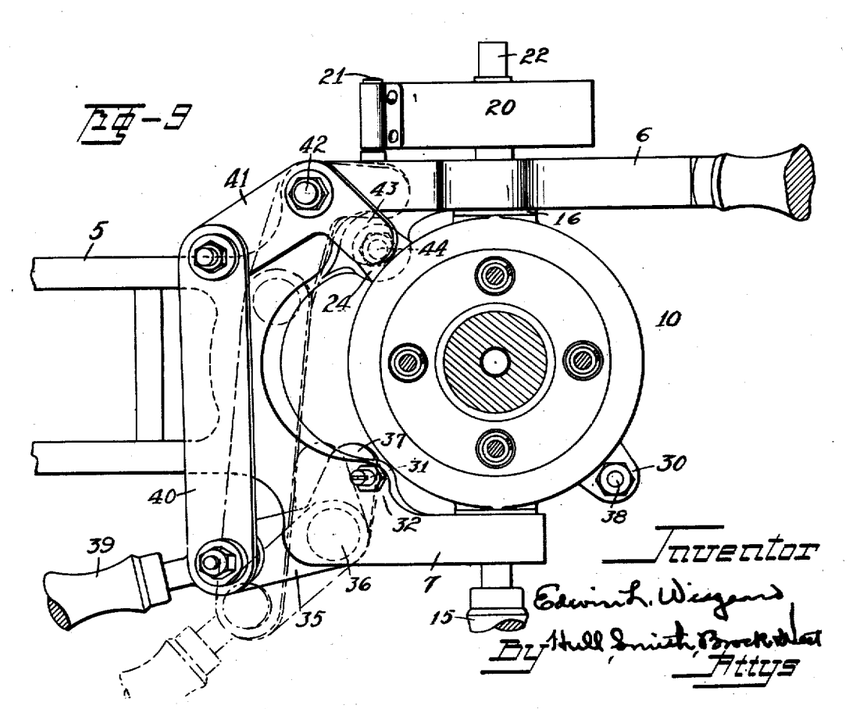
Fig. 9 a sectional plan on the line 9—9 of Fig. 4, looking downward.

To maintain the supporting ring 11 in either of its positions during certain phases of the work, and for reasons which will be brought out during the description of the operation of the apparatus, I provide a latch for coöperation with each of the stops 24 and 30. That for coöperation with the stop 30 consists of an angle lever 35 that is pivoted at 36 to the underneath side of the inner end of the branch 7. When the stop 30 bears against the stud 31, the latch end 37 of the lever 35 may be projected beneath an adjustable abutment 38, carried by the stop 30, by swinging the lever in the direction indicated by the arrow in Fig. 9, by means of the handle 39, (the disengaged position of the parts being indicated in said figure by dot and dash lines). It follows from what has been said above in regard to the spring 20, that when the lever 35 is swung to disengaged position to release the stop 30, the ring will be rotated by the spring to engage its stop 24 with the plunger of the dash pot 26. Now by returning the lever 35 to its former or engaged position, it will, through the intervention of a link 40, swing a bell crank 41 upon its pivot 42 to project its latch end 43 over an adjustable abutment 44 that is carried by the lug 24. Thus it will be seen that the supporting ring may be latched in either of its positions by means of this same general mechanism that is actuated by the handle 39.

I shall now describe the organism of the head 10. With the head in position shown in Fig. 4, an annular member 50, which I shall term the turn-table surmounts the supporting ring, and to insure freedom of rotation of the turn-table upon the supporting ring I interpose between the two, anti-friction bearings 51. The central bores of the supporting ring and turn-table are of the same diameter and receive the cylindrical neck 53 of a turret 54. Inasmuch as the present apparatus is designed for use in the production of sad iron bases, the turret 54, and the parts which it supports, conform in outline to a sad iron base. Fillister head screws 55 extend through holes 56 in the turn-table and are threaded into alining tapped apertures 57 of the turret. The adjacent faces of the turret and turn-table are recessed about the screws to receive springs 60, and cavities 61 are formed in the opposite side of the turn-table to accommodate the heads of the screws 55, the cavities being of sufficient depth to permit longitudinal movement of the screws without the heads striking the supporting ring. A cushion 62, which may consist of a washer of rubber, or other suitable material, is interposed between the supporting ring and turn-table to absorb the shock incident to the operation of the apparatus. As shown the heads of the screws 55 engage the bottom walls of the cavities 61 to hold the turret and turn-table against undue separation; and the turret and turn-table are held in proper relation to the supporting ring by a retainer 64 that is connected, by screws, 65, to the end of the turret neck 53 and overhangs the inner edge of the supporting ring. A cap 66, attached by screws 67 to the supporting ring, incloses the retainer 64.

Figures 4, 5, 6, 7:
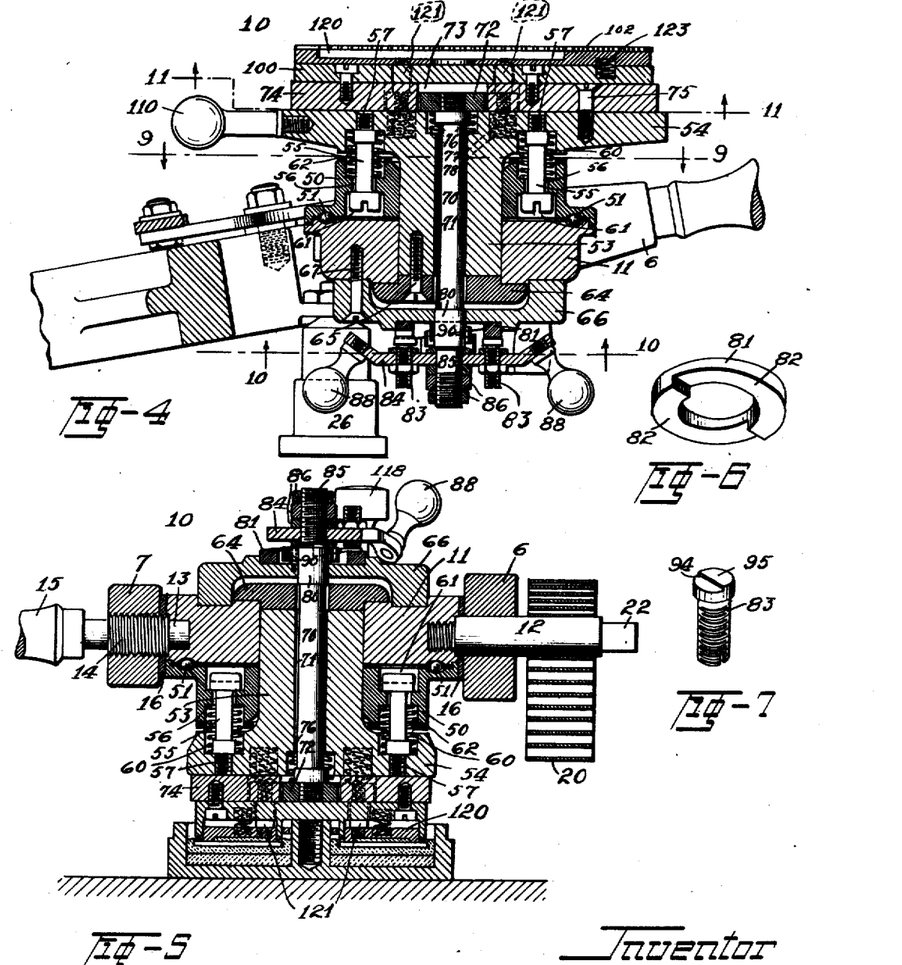

A post 70 extends through a longitudinal bore 71 of the turret neck and has attached to its end above the turret as viewed in Fig. 4 a four branch cross-head 72 (see Fig. 11) that is reciprocable within a recess 73 of similar shape in a plate 74. The plate 74 is secured to the turret by screws 75. A spring 76, within the counterbored upper end of the bore 71, and springs 77, occupying cavities 78 formed in the upper face of the turret 54 beneath each of the branches of the cross-head 72, tend to elevate the cross-head. This movement of the cross-head is controlled by means associated with the opposite end of the post 70 and which will now be described.

An enlarged portion 80 of the post 70 has a sliding fit within a central aperture of the cap 66, and about the aperture, the cap is recessed for the reception of a ring cam 81. The ring is divided circumferentially into two similar cam portions 82, and the head of a stud 83 is arranged to coöperate with each cam portion. The studs are adjustably carried by a cross-arm 84 that is applied to the reduced end 85 of the post and is held thereon by nuts 86. A handle 88 is affixed to each end of the cross-arm. A spiral spring 90 reposes within the cam ring 81 and is anchored at one end to a pin 91, carried by the arm, and at the other end, to a pin 92, carried by the cap 66. The spring 90 tends to rotate the arm upon the post in a direction to cause the heads of the studs 83 to ride down the inclines of the cam portions 82. It will be observed, especially in Fig. 7, that the face of each stud 83 is divided into two planes of different elevation by a vertical lip 94, the cam engaging portion 95 to one side of the lip being preferably inclined to correspond to the inclination of the cam portions 82. By rotating the cross-arm 84 in opposition to the spring 90 until the lips 94 of the studs 83 snap over the ends of the cam portions 84, the arm will be held in its newly assumed position; and it may be explained that, when in such position, the post 70 and the cross-head 72 are retracted and springs 76 and 78 compressed.

Figure 2:
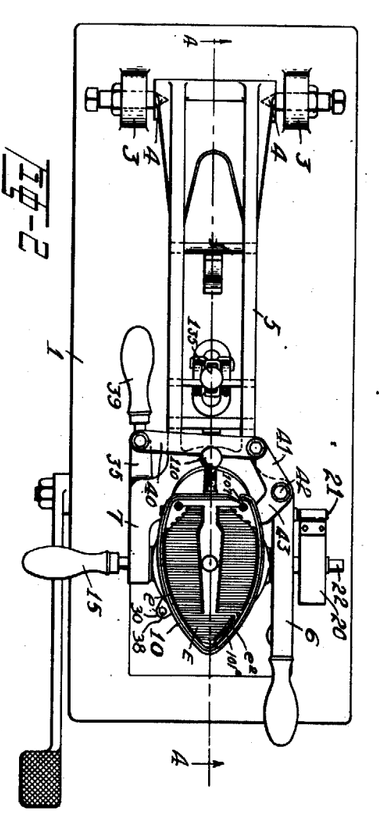
Figures 14, 15:
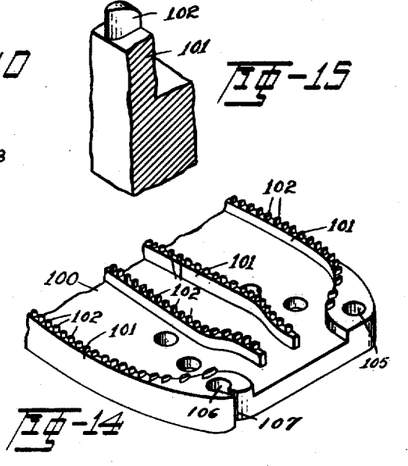
Fig. 14 is a fragmentary perspective view of the form.
Fig. 15 is an enlarged detail, in perspective, showing one of the element supporting pegs or projections and the adjacent portion of the form.

The form 100, whereon the element that is to be received by the body of supporting material is given its shape is applied to the plate 74, and is provided on its upper face with ribs 101. Rising from the ribs are numerous element engaging projections 102, and the projections of the respective ribs are so disposed to those of the others as to impart to the element, designated E, the shape desired in any case, as that revealed in Fig. 2. The form 100 is preferably made of steel with the ribs 101 integral with its body portion and the projections 102 are produced by milling or otherwise cutting away the material between them and finishing each projection to present a comparatively sharp but smooth edge, as illustrated on an enlarged scale in Fig. 15, and about which the element may be turned. By producing the form in this manner instead of by setting pins into a plate as in my former patent hereinbefore referred to, I am able to get the turns of the element closer together—as close, in fact in the case of heating devices, as safety against short circuiting permits, resulting in greater length and mass of element and consequently a longer life thereto.

Figure 8:
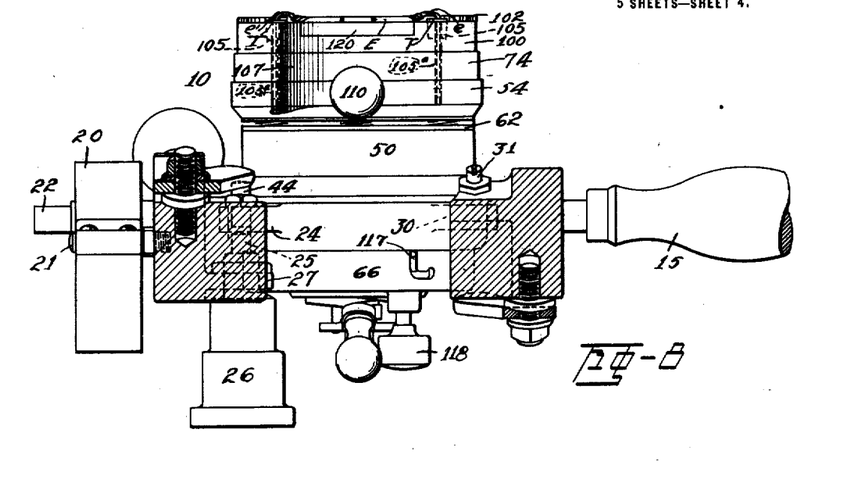
Fig. 8 is a section of the line 8—8 of Fig. 3.

The elements of electrical heating devices have terminals attached to their ends consisting of comparatively heavy wire. These terminals I extend at right angles from the plane of the element through bushings of suitable substance that are partially embedded in the body of supporting material. Preliminary to placing the element upon the form, the terminal e is attached to one end, a bushing T is applied to the terminal and inserted into an orifice 105 in register with a bore 105$^a$ extending through the plate 74 and turret, as indicated in dotted lines in Fig. 8, and into which bore the protruding end of the terminal projects. The element is then engaged manually or by mechanical means over the projections 102 (Fig. 2) and just prior to applying it to the last few projections the element is cut to proper length, a terminal e' is attached to its end, the remaining portion engaged over the remainder of the projections 102, a bushing applied to the terminal e' and the terminal with its bushing placed in the orifice 106 and alining bore 106$^a$, entrance to which is facilitated by a slot or way 107 in the form and plate 74 and flanged end of the turret.

The turret is provided with a handle 110 for the purpose of turning it to and fro in a horizontal plane during the winding of the element upon the form. As will be more fully appreciated later on, it is essential to lock the turret in fixed relation to the supporting ring before the head is inverted for introducing the element into the body of supporting material. This is accomplished through the locking pin illustrated in detail in Figs. 12 and 13. The pin 112 is shown as guided vertically within a bore in the supporting ring 11 and cap 66 and its lower tapered end 113 is adapted to enter a recess 114 in the turn-table 50 when the pin is brought into register therewith and released. The reduced upper end of the pin extends through a bore in the cap 66 which is counter bored to receive a spring 115 that tends to move the pin into locking position. A peg 116 extends from the side of the locking pin through an L-shaped slot 117 that opens through the side of the cap 66. By grasping the head 118 and retracting the pin and turning it so as to swing its peg 116 into the lateral branch of the slot 117, the locking pin may be held in disengaged position while the turret is being swung as aforesaid in the element winding operation.

Figures 11, 12, 13, 16, 17:
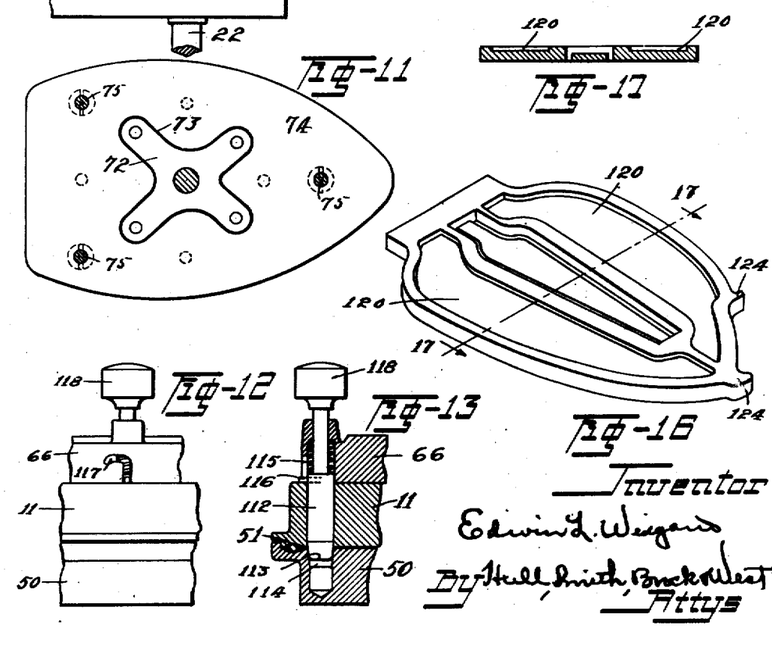
Fig. 11 is a section on the line 11—11 of Fig. 4, looking in the direction of the arrows.
Figs. 12 and 13 are, respectively, elevational and sectional details of the turret locking pin, the plane of the section of Fig. 13 being indicated by the correspondingly numbered line of Fig. 10.
Fig. 16 is a perspective view of the stripper.
Fig. 17 a transverse section through the same.

Nesting within and guarded by ribs of the form 100 is a stripper plate 120, shown in perspective in Fig. 16. The stripper plate is connected to the ends of the arms of the cross-head 72 by studs 121 which pass loosely through the apertures in the form, as shown best in Fig. 4. While the springs 76 and 77 act, through the cross-head, to elevate the stripper plate, this action may be enhanced by auxiliary springs 123 which repose within registering recesses of the form and stripper plate. There may be any desired number of these auxiliary springs and they may be distributed about the stripper plate to equalize its pressure against the element when the stripper mechanism is actuated. It will be observed that the stripper plate is provided with depressions 120 (Figs. 16 and 17). Attention is also called to the projections 124 which extend from the forward end of the stripper plate. These are designed to project through notches in the peripheral rib of the form to disengage a section of the element designated $e^2$ in Fig. 2 and which extends along the form outside a set-in portion $101^a$ of its rib, this or a similar construction being desirable in the case of the particular type shown, as will be readily understood.

Figure 1:
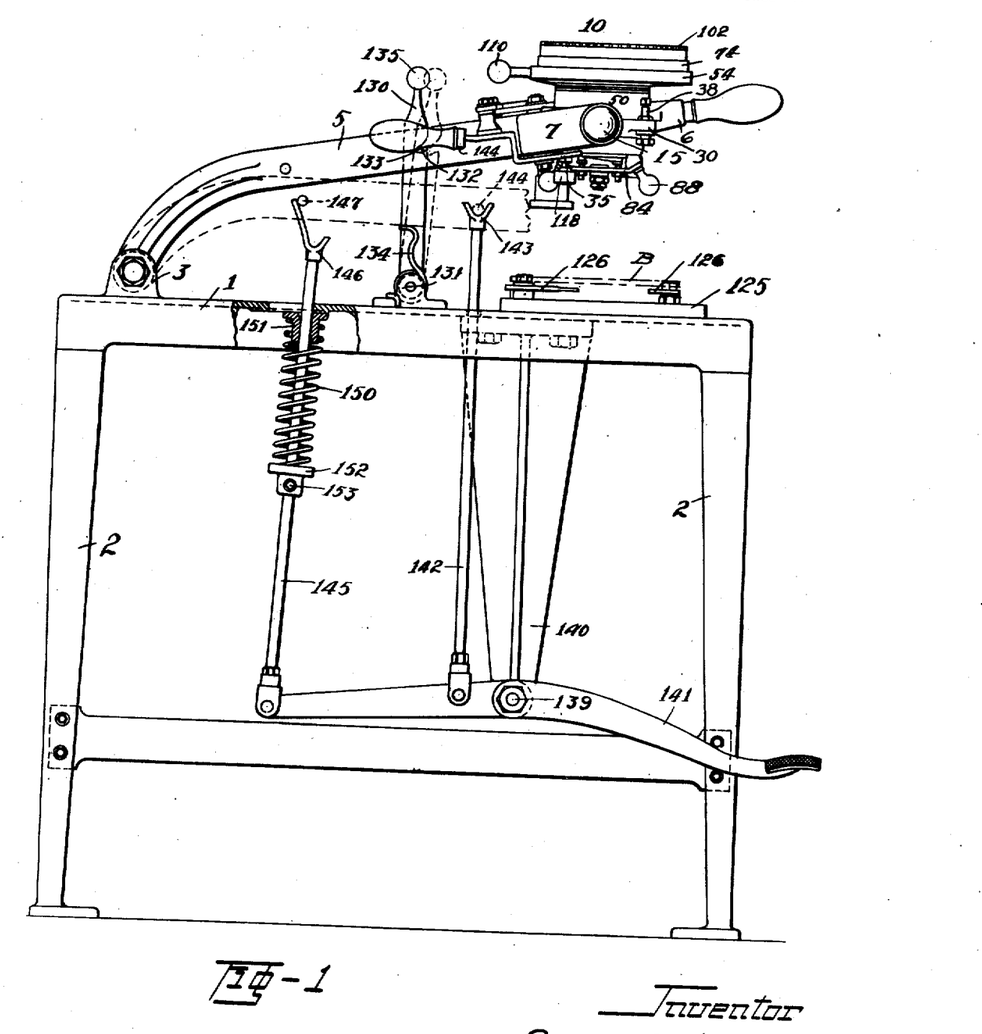
Figure 1 is a side elevation, and Fig. 2 a plan view of the apparatus.

The receiving element B, shown in dot and dash lines in Fig. 1, (which, in the present instance, constitutes a sad iron base that is partially filled with an impressionable or plastic material, as set forth in my Patent No. 1,133,347 previously referred to) is supported upon a plate 125, applied to the forward end of the bed 1, and carrying suitable positioning devices 126 whereby the receiving element is properly located with respect to the head. For the sake of simplicity and without limiting effect, the receiving elements will be referred to in certain of the claims as the base.

The arm 5 is adapted to be sustained in elevated position by means of a lever 130, pivoted between the ears of a bracket 131 on the bed 1, the lever having a notch 132 in its forward edge for the reception of a pin 133 that is carried by the arm. A spring 134 tends to rock the lever in the direction of the pin and it may be conveniently swung in opposition to the spring by means of its head 135. Upon disengaging the lever 130 from the pin 133, the arm 5 may be lowered more or less forcibly to the dotted line position of Fig. 1. From this dotted line position it may be restored to its former position by foot power through the medium of mechanism which I shall now describe.

Pivoted upon a stud 139 suspended in a bracket 140 from the under side of the machine bed is a foot lever 141. Immediately to the rear of its fulcrum, the lever has pivotally connected to it a rod 142 which rises through the bed of the apparatus and carries a fork 143 at its upper end which is normally sustained in a position to engage a pin 144, carried by the arm 5, when the arm descends. To the rear extremity of the foot lever is similarly connected a second rod 145 which rises through the bed 1 and has a fork 146 applied to its upper end for the reception of a pin 147 that is carried to the arm 5, one branch of the fork being elongated to bear upon the side of the pin and thus properly guide the fork as it approaches the pin, when the arm is depressed. A compression spring 150 confined between the flange of a thimble 151 that is applied to the rod 145 and bearing against the underneath surface of the bed 1, and a collar 152 that is secured by a set screw 153 to the rod, keeps the treadle mechanism in the restive position shown in Fig. 1. It will be noted that the bed is slotted for the passage of the rod 145 to afford the rod sufficient swinging movement to follow the arcuate course of the pin 147.

In the use of the machine, the operator, starting with the parts in the position shown in full lines in Fig. 1 and with the turret unlocked from the supporting ring, winds the element as already described. He then releases the locking pin 112 and turns the turret to bring the pin in register with the recess 114, thereby locking the turret to the ring. The head 10 is then unlatched by swinging the lever 35 outward; and, by grasping the handle 110, the operator inverts the head and secures it in inverted position by returning the lever 35 to its former position. By inverting the head, the tension of the spring 20 has been increased, and the latching mechanism retains the head in inverted position against the tension of the spring. The operator next disengages the lever 130 from pin 133, lowering the arm more or less forcibly as desired depending upon the consistency of the receiving material.

Figure 10:
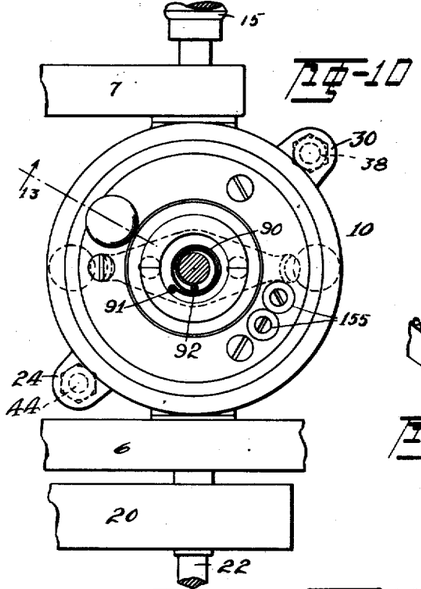
Fig. 10 is a section on the line 10—10 of Fig. 4 looking upward.

By impact of the head with the receiving element or base, the entering element is thoroughly embedded within the supporting material and the material is caused to ooze up about the element and into the depressed portions of the stripper plate the plate exerting a pressure upon the material and causing it to close in over and imprison the element, in the manner already explained. At the instant of impact, there is a slight relative movement created between the parts normally maintained separated by the cushion springs 60, sufficient to withdraw the ends of the cam portions of the ring 81 from the heads of the studs 83, thus unlatching the stripper mechanism and allowing the spring 90 to swing the cross-arm and the studs about over the depressed portions of the cams (the swinging of the cross-arm being limited in both directions by the stops 155—Fig. 10). With the parts thus released, the springs 76, 77 and 123 elevate the form (and parts surmounting it) to withdraw the projections 102 from the base, while the stripper plate remains in contact therewith.

The operator may now depress the foot pedal 141, and the initial movement thereof is transmitted to the arm 5 through the rod 142. In point of connection of the rod with the lever being near its fulcrum, while the engagement of the rod with the arm is a material distance from the pivot point of the arm, will cause the incipient upward movement of the arm to be quite gradual so that the parts are gently removed from contact with the receiving element or base so as not to disturb the element, or in any way injure the product. By the time this has occurred, the fork 146 of the rod 145 has actively engaged the pin 147 of the arm and from now on the speed of the arm with relation to that of the foot lever is greatly increased by reason of the fact that the connection of the rod 145 with the foot lever is quite remote from the fulcrum of the lever while its connection with the arm is comparatively near the pivot of the arm. When the arm has attained its normal height, the lever 130 is swung forwardly by the spring 134 to engage the pin 133 within its notch 132 thereby to hold the arm elevated. The operator may now retract the stripper plate and latch it in its normal position by rotating the cross-arm 86 to engage the lips of the studs 83 over the ends of the cam portions 82. Now by unlatching the head through the medium of the lever 35, the spring 20 will be permitted to return the head to normal or winding position, and upon the striking of the lug 24 of the supporting ring against the stem of the dash pot 26, the lever 35 may be swung into engaging position to lock the head. By unlocking the turret from the supporting ring, the apparatus will be placed in condition for a repetition for the foregoing operation.

Having thus described my invention, what I claim is:—

1. In an apparatus of the character described, the combination of a carrier for an element, a support for a receiving element, the support and carrier being relatively movable to present the former element to the latter element, and means actuated by reason of the relative movement between the carrier and support for removing the first element from its carrier when presented in proper relation to the receiving element.

2. In apparatus of the character described, the combination of a support for a receiving element, a sustaining structure. a carrier for an element to be received by the former element and supported by the sustaining structure, the support and structure being relatively movable to present the latter element to the former, the carrier being movable with respect to the sustaining structure, and means for removing the second element from its carrier, said means being actuated by reason of the relative movement between the carrier and the sustaining structure produced by the engagement of the carrier with the receiving element.

3. In apparatus of the character described, the combination of a support for a receiving element, a carrier for an element to be received, a sustaining structure for the carrier and with respect to which the carrier is movable, the support and sustaining structure being relatively movable to present the second element to the first, the parts being so arranged that movement is created between the carrier and the sustaining structure when the second element is in proper relation to the first element, and means adapted to act by reason of the relative movement between the carrier and its sustaining structure for removing the second element from the carrier.

4. In apparatus for emplacing an element in a base, the combination of a sustaining structure, an element carrier yieldingly sustained by the structure, and means for removing the element from the carrier, said means being actuated by reason of a relative movement between the carrier and structure, said movement resulting from the impact of the carrier with the base.

5. In apparatus for emplacing an element in a base, the combination of a carrier for the element, and means actuated by reason of relative movement between the base and carrier for removing the element from the carrier when the element is presented in proper relation to the base.

6. Apparatus for emplacing an element in a body of supporting material comprising means for presenting the element to the body of material and for directing the material over the element to secure it within the material, and means for separating the element and the carrier.

7. Apparatus for emplacing an element in a body of supporting material comprising an element carrier for presenting the element to the body of material, and means for removing the element from the carrier and directing the material over the element to imprison it within the material.

8. Apparatus for emplacing an element in a body of supporting material comprising an element carrier for inserting the element into the body of material, means adapted to direct the material over the element to secure it in the material, and means for removing the element from the carrier.

9. In emplacing apparatus, the combination of a support for a base, a sustaining structure, the support and sustaining structure being relatively movable toward and from each other, an element carrier supported by the sustaining structure and invertible from element receiving to element depositing position, means for moving the carrier from one position to the other, and means operating automatically to return the carrier to its former position.

10. In emplacing apparatus, the combination of a support for a base, a sustaining structure, the support and structure being relatively movable toward and from each other, an element carrier supported by the sustaining structure and invertible from element receiving to element depositing position, latch mechanism for holding the carrier in each of said positions, means for inverting the carrier, and means operating automatically upon the release of the latch mechanism for returning the carrier to its former position.

11. In emplacing apparatus, the combination of a support for a base, a sustaining structure, the support and sustaining structure being relatively movable toward and from each other, an element carrier supported by the sustaining structure and invertible from element receiving to element depositing position, latch mechanism for holding the carrier in either of said positions, means tending to move the carrier from one position to the other, and further means for moving the carrier in opposition to the former means.

12. In emplacing apparatus, the combination of a support for a base, a sustaining structure, the support and sustaining structure being relatively movable toward and from each other, an element carrier supported for oscillation by the sustaining structure from element receiving to element depositing position, a spring tending to move the carrier from one position to the other, latch mechanism for holding the carrier in the first position in opposition to the spring, and a shock absorbing stop for arresting the movement of the carrier when moving under the influence of the spring.

13. In emplacing apparatus, the combination of a support for the base, a sustaining structure, the support and sustaining structure being relatively movable toward and from each other, an element carrier supported for oscillation by the sustaining structure from element receiving to element depositing position, a spring tending to move the carrier from one position to the other, latch mechanism for holding the carrier in the first position in opposition to the spring, and a stop for arresting the movement of the carrier when moving under the influence of the spring.

14. In emplacing apparatus, the combination of a support for a base, a sustaining yoke, the support and yoke being relatively movable toward and from each other, an element carrier trunnioned within the yoke, a trunnion of the carrier extending through a branch of the yoke, a spring operatively connected to said trunnion and anchored to the yoke and tending to rotate the carrier in one direction, stops carried respectively by the yoke and carrier for limiting oscillatory movement of the carrier, and latch mechanism for holding the carrier at one limit of its movement in opposition to the aforesaid spring.

15. In emplacing apparatus, the combination of a support for a base, a sustaining structure, the support and sustaining structure being relatively movable toward and from each other, an element carrier supported by the sustaining structure and invertible from element receiving to element depositing position, stops carried respectively by the carrier and sustaining structure for restricting the movement of the carrier between said positions, a latch for holding the stop of the carrier in engagement with the stop of the sustaining structure when the carrier is in each of its aforesaid positions, and common means for actuating said latches simultaneously.

16. The combination of a sustaining structure, an element carrier yieldingly supported thereby, an element remover movable with respect to the carrier, means tending to actuate the remover, and mechanism for holding the remover in opposition to the actuating means, said holding mechanism being rendered ineffective by relative movement between the sustaining structure and the carrier.

17. The combination of a sustaining structure, a form yieldingly supported thereby, a stripper movably carried by the form, means tending to actuate the stripper to remove an element from the form, latching mechanism for holding the stripper in opposition to the actuating means, said mechanism being rendered ineffective by relative movement between the sustaining structure and form, and means for restoring the latching mechanism to effective condition.

18. The combination of a sustaining structure, a form yieldingly supported thereby, a stripper movably carried by the form, means tending to actuate the stripper to remove an element from the form, a cam having a latch portion, and an abutment arranged to traverse the cam and having a latch portion for coöperating with the corresponding portion of the cam, the cam and abutment being carried one by the sustaining structure and the other operatively connected with the stripper, whereby when the abutment traverses the cam it will remove the stripper in opposition to the aforesaid means.

19. The combination of a sustaining structure, a form yieldingly supported thereby, a stripper movably carried by the form, means tending to actuate the stripper to remove an element from the form, a cam carried by the sustaining structure, said cam having a latch portion, and an abutment operatively connected with the stripper and arranged to traverse the cam and thereby move the stripper in opposition to the aforesaid means, said abutment having a latch portion for coöperating with the corresponding portion of the cam.

20. The combination of a sustaining structure, a form yieldingly supported thereby, a stripper movably carried by the form, means tending to actuate the stripper to remove an element from the form, a movement inducing member carried by the sustaining structure, said member having a latch portion, and a coöperating movement inducing member operatively connected with the stripper and fixed with respect to the stripper in the direction of the latter's movement but relatively movable in a plane at substantially right angles to said movement.

21. The combination of a sustaining structure, a form yieldingly supported thereby, a stripper movably carried by the form, means tending to actuate the stripper to remove an element from the form, a movement inducing member carried by the sustaining structure, said member having a latch portion, a coöperating movement inducing member operatively connected with the stripper and fixed with respect to the stripper in the direction of the latter's movement but relatively movable in a plane at substantially right angles to said movement, and means tending to move the second mentioned member in the latter direction upon a disengagement of the latch portions of the coöperating members.

22. The combination of a sustaining structure, a form yieldingly supported thereby, a stripper movably carried by the form, means tending to actuate the stripper to remove an element from the form, a cam carried by the sustaining structure, an abutment operatively connected with the stripper and rotatable in a plane at substantially right angles to the direction of movement of the stripper, the abutment being immovable with respect to the stripper in the direction of the latter's movement, the cam and abutment having coöperating latch portions for holding the stripper in operative condition, and a spring tending to rotate the abutment and cause it to descend the cam when the abutment is unlatched from the cam.

23. The combination of a supporting member, a turntable sustained thereby, the supporting member and turntable having alining bores, a form having a tubular neck extending through said bores, means connecting the turntable and form while permitting a limited separation between the two, a cushion device interposed between the turntable and form, a retainer applied to the neck of the form for holding it against withdrawal from the bores of the supporting member and turntable, a stripper for removing an element from the form, a post operatively connected with the stripper and extending through the neck of the form, a cross arm on the post, a cam carried by the supporting member, a device adjustably carried by the arm for coöperation with the cam, the cam and arm being relatively rotatable and having interengaging latch portions, means tending to move the stripper to operative position and in opposition to the cam, the latch portions of the cam and device coöperating to hold the stripper in inoperative position, and a spring tending to create relative rotation between the cam and device when their latch portions are disengaged.

24. The combination of a supporting member, a turntable sustained thereby, the supporting member and turntable having alining bores, a form having a tubular neck extending through said bores, means connecting the turntable and form while permitting a limited separation between the two, a cushion device interposed between the turntable and form, a retainer applied to the neck of the form for holding it against withdrawal from the bores of the supporting member and turntable, a stripper for removing an element from the form, a post operatively connected with the stripper and extending through the neck of the form, a cross arm on the post, a cam carried by the supporting member, a device carried by the arm for coöperation with the cam, the cam and arm being relatively rotatable and having interengaging latch portions, means tending to move the stripper to operative position and in opposition to the cam, the latch portions of the cam and device coöperating to hold the stripper in inoperative position, and a spring tending to create relative rotation between the cam and device when their latch portions are disengaged.

25. The combination of a supporting member, a turntable sustained thereby, the supporting member and turntable having alining bores, a form having a tubular neck extending through said bores, means connecting the turntable and form while permitting a limited separation between the two, a cushion device interposed between the turntable and form, a retainer applied to the neck of the form for holding it against withdrawal from the bores of the supporting member and turntable, a stripper for removing an element from the form, a post operatively connected with the stripper and extending through the neck of the form, a cross arm on the post, a cam carried by the supporting member, a device carried by the arm for coöperation with the cam, the cam and arm being relatively rotatable and having interengaging latch portions, means tending to move the stripper to operative position and in opposition to the cam, the latch portions of the cam and device coöperating to hold the stripper in inoperative position, a spring tending to create relative rotation between the cam and device when their latch portions are disengaged, and means for temporarily locking the supporting members and turntable against relative rotation.

26. A tool for use in the production of elements of the character set forth comprising, in combination, a plate having spaced ribs, projections rising from the ribs for supporting an element, and a stripper nesting within and guided by the ribs of the plate.

27. A tool for use in the production of elements of the character set forth comprising, in combination, a plate having spaced ribs, projections rising from the ribs for supporting an element, a stripper nesting within and guided by the ribs of the plate, springs interposed between the plate and stripper, and means controlling the movement of the stripper.

28. A form of the character set forth comprising a plate having opposed ribs and projections rising from the ribs.

29. A form of the character set forth comprising a plate having integral opposed ribs, the ribs being notched to provide spaced pegs of like width for the support of an element of a given thickness, the pegs of one rib being opposite the notches of the other, and each notch being of a width substantially equal to the aggregate width of a peg and a double thickness of the element, as and for the purpose specified.

30. A form for the production of elements of the character described comprising a plate having opposed rows of element supports provided with recesses for the reception of right angle terminals of the element, one recess opening out to the side of the plate to permit ready access of the terminal into the recess.

31. In apparatus of the character described, the combination with a support for a base, and an element carrying arm pivotally supported in operative relation thereto; of mechanism for elevating the arm comprising a pivoted lever, a push rod interposed between a point of the lever relatively near its pivot, and a point of the arm remote from the fulcrum thereof, and a second push rod interposed between a point of the lever further removed from its pivot than the former point and a point of the arm relatively near its fulcrum.

32. In apparatus of the character described, the combination with a support for a base, and an element carrying arm pivotally supported in operative relation thereto; and means for elevating the arm involving a member through a continuously regular movement whereof the arm is caused to rise comparatively slowly through its initial movement and considerably faster through the remainder thereof.

33. In apparatus of the character set forth, the combination of a support for a base, an element carrying arm pivotally supported in operative relation thereto, a pedal, and connections between the arm and pedal whereby a depression of the latter will elevate the former.

34. The process of embedding an element in a body of impressionable material consisting in introducing the element into the body and displacing the material under pressure to cause it to envelop the element.

35. The process of embedding an element in a body of impressionable material, consisting in introducing the element into the body and in the same operation displacing the material by pressure causing it to envelop and secure the element.

In testimony whereof, I hereunto affix my signature.

EDWIN L. WIEGAND.

DISCLAIMER 1,312,657.—*Edwin L. Wiegand*, Youngstown, Ohio. EMPLACING PROCESS AND APPARATUS. Patent dated August 12, 1919. Disclaimer filed November 2, 1938, by the patentee; and the licensee, *Edwin L. Wiegand Company*.

Hereby enter this disclaimer:

A. To so much of claim 34 of said Letters Patent as may cover any process other than: The process of embedding an antecedently arranged electric resistance element in a provided body of impressionable electrical insulating material, the element being associated with means holding the element in formation, consisting in introducing the antecedently arranged element into the provided body of material while the element continues to be associated with said means, and displacing the material under pressure exerted at least in part by said means, to cause it to envelop the element.

B. To so much of claim 35 of said Letters Patent as may cover any process other than for embedding an electric resistance element arranged in relatively thin and wide formation in a provided body of impressionable electrical insulating material or in which the element is not introduced broadside into the provided body of material.

[*Official Gazette December 6, 1938.*]